Oct. 25, 1966 P. NEWMAN 3,281,773
METHODS AND APPARATUS USING A SINGLE DOWNHOLE DETECTOR
FOR MAKING SEISMIC VELOCITY MEASUREMENTS
Filed Jan. 21, 1963 2 Sheets-Sheet 1

INVENTOR
PAUL NEWMAN
BY MASON, KOLEHMAINE
RATHBURN & WYSS
ATTORNEYS

Oct. 25, 1966 P. NEWMAN 3,281,773
METHODS AND APPARATUS USING A SINGLE DOWNHOLE DETECTOR
FOR MAKING SEISMIC VELOCITY MEASUREMENTS
Filed Jan. 21, 1963

United States Patent Office 3,281,773
Patented Oct. 25, 1966

3,281,773
METHODS AND APPARATUS USING A SINGLE DOWNHOLE DETECTOR FOR MAKING SEISMIC VELOCITY MEASUREMENTS
Paul Newman, Keston, Kent, England, assignor to Seismograph Service Corporation, Tulsa, Okla.
Filed Jan. 21, 1963, Ser. No. 252,979
Claims priority, application Great Britain, Jan. 23, 1962, 2,414/62
10 Claims. (Cl. 340—15.5)

This invention relates to methods of and systems or apparatus for use in carrying out seismic measurements or tests. It is more particularly concerned with the measurement of the velocity of propagation of seismic disturbances or signals, although it is also applicable to the investigation of other propagation characteristics.

Various geophysical applications require an accurate knowledge of the characteristics of propagation of seismic energy through the earth's crust. Of these characteristics, velocity of propagation in a vertical direction is of particular importance. This velocity information is commonly, and at the present time most accurately, obtained by timing the travel of an impulse which has been deliberately generated at or near the earth's surface, to a detector suspended in a bore-hole.

Generation of such an impulse is most often accomplished by detonating explosive charges, usually placed in drilled shot-holes, or by employing special equipment for raising and dropping a heavy weight. When such operations are required in remote areas the cost and inconvenience of providing equipment for the generation of these impulses can be very considerable.

Additionally, explosive charges must be located at a safe distance from the bore-hole, and also from the drilling equipment which is usually erected at the bore-hole; hence, in order to obtain seismic velocity data for a vertical travel path various corrections must be applied to the recording readings. Such corrections are subject to errors due to subsurface conditions which it may not be possible to delineate.

A further disadvantage of existing methods is the time consumed by the operation, during which all activity at the drilling site which results in seismic disturbance must be restricted. This entails shutting down all machinery and generators and precludes the carrying out of possible maintenance work on drilling equipment. Such interruptions are extremely costly in terms of unproductive lost time.

It is one of the objects of the present invention to provide improved methods of and systems or apparatus for determining propagation characteristics of seismic disturbances which do not require the firing of shots nor the dropping of weights, while a more particular object of the invention is the provision of such methods, systems and apparatus which make use of prolonged disturbances which can readily be generated at the surface using existing drill head equipment.

It is a further and more particular object of this invention to provide methods of, systems and apparatus for measuring seismic velocities, particularly in a vertical direction.

Yet another object of the invention is to provide such methods, systems and apparatus in which the required results are obtained by comparing the responses of two (or more) detectors both of which are spaced apart by a known distance at positions down a bore-hole using a continuous seismic disturbance which is generated at or near the top of the bore-hole using one or more engines forming part of existing drill head equipment.

A further and alternative object of the invention is to provide such methods, systems and apparatus in which one detector is operated at a fixed datum point, which may be and preferably is at or close to the top of the bore-hole but which may be spaced from it either laterally or down the bore-hole, while the second detector or a number of such detectors is or are operated at a succession of points which are spaced from the first detector at different distances down the bore-hole the differences or increments between the said distances being known.

Further objects, features and advantages of the present invention will become apparent from the following description, taken in conjunction with the accompanying drawings.

Before proceeding further is may be explained here that by the term "correlation" as used herein there is meant an assessment of the similarity or relationship between two quantities.

The term "cross-correlation" refers to the correlation of one function with another function. It may advantageously be effected by multiplying one function by the other and by integrating the product over a finite time.

By auto-correlation is meant the cross-correlation of two identical patterns or the correlation of one pattern with itself.

Figure 1:
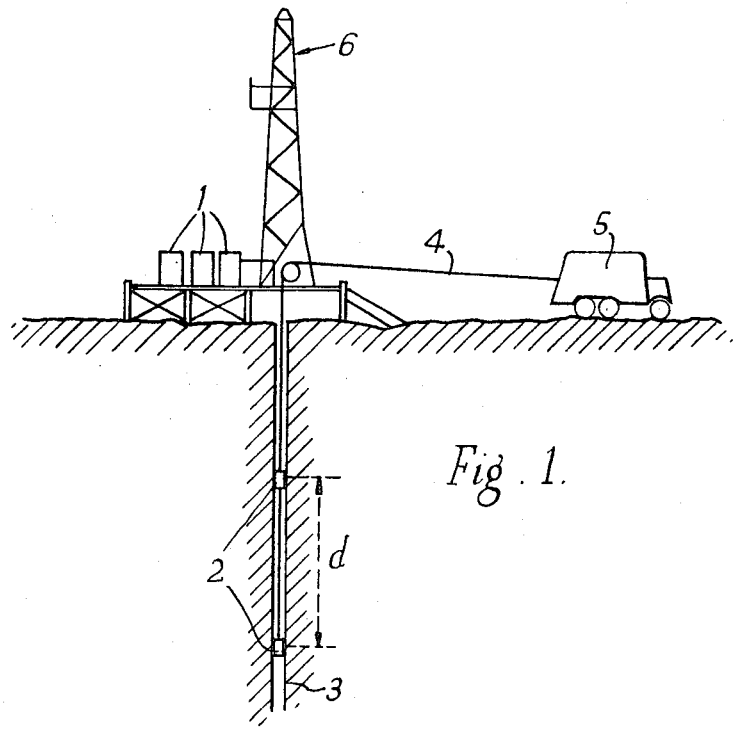
FIGURE 1 is a digrammatic view illustrating the measurement of seismic velocity at a bore hole, according to one method of carrying out the present invention.
Figure 2:
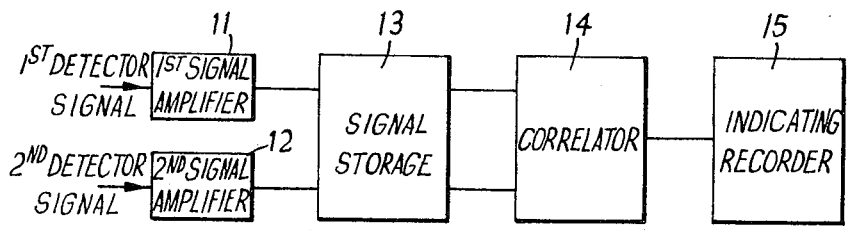
FIGURE 2 shows, purely diagrammatically, one form of apparatus which may be used for receiving and processing signals received from detectors, such as those shown in FIGURE 1.

Referring to FIGURES 1 and 2 of the accompanying drawings, these illustrate and will be used to describe one method by which the present invention may be applied to the problem of determining seismic velocities from observations in a bore hole, utilizing the drilling rig motive power plant as a source of a continuous seismic disturbance or signal. This will have at least one component of constant frequency determined by the speed of the engine or engines driving the equipment.

Referring first to FIGURE 1, this shows a drilling rig having a number of power units, which are indicated diagrammatically at 1. These are shown as comprising three separate engines, one of which may be used for operating the drill and a second of which may be used for operating associated equipment. The third unit may be spare but it may also be run to increase the seismic signals, if this is thought necessary when measuring velocities by or other characteristics using one of the methods of the present invention.

In the arrangement shown in FIGURE 1, two suitably spaced detectors or geophones 2 are lowered into a borehole 3. They are carried by a cable 4, on which they are spaced apart by a known distance $d$. The cable is operated by a cable hoist truck 5. The reference 6 indicates the usual derrick which is erected above and which is used for drilling the bore-hole 3.

It is to be understood that more than two detectors may sometimes be used to advantage and that the spacing may be varied to suit individual circumstances.

The type of detectors used may depend on and be decided by the propagation characteristics or seismic parameter information about which is particularly required. For example, where the propagation characteristics of the earth formation surrounding the bore-hole are of particular interest, detectors which can be readily engaged with and which are designed to respond to pressure changes within or motions of such formations may be employed. Alternatively, when tests are being made with the bore-hole containing a liquid and information is required about the characteristics of the liquid-filled bore-hole, detector may be used which are designed especially to respond to pressure changes in or movements of such a liquid.

Referring again to FIGURE 1 and assuming that it is desired to obtain velocity data about a section of subsurface formation, the two detectors 2 are lowered into the bore-hole so that between them they span this section or a part of it. With the power units 1 operating at steady speeds, which may be different for different engines and which may be individually adjusted to values which are found best for the practice of the present invention, simultaneous recordings are made of the resulting signals from both detectors, these recordings being made with a common time scale.

The two recorded signals are then cross-correlated with relative time as a variable function, such that the relative time displacement between the two signals as recorded, for a cross-correlation function maximum, represents the seismic travel time through the subsurface section spanned by the two detectors. This cross-correlation may be effected in a manner which will be more fully described hereinafter. Since the distance $d$ between the detectors 2 is known the resulting data can readily be converted into terms of seismic velocity between the detectors.

Since the velocities under consideration vary between the known limits of about 5,000 to 30,000 feet per second, and if, for example, the detector spacing is 500 feet, the relative time displacement for maximum correlation function will fall within the fixed limits of about 17 to 100 milli-seconds; and other maxima occurring outside these limits may be disregarded. Thus, in the case being considered, no confusion of results can occur provided that the seismic disturbance can be considered to be of unique character within an 83 millisecond period.

The above limits can in practice be further narrowed in the light of local experience, or by reference to a reasonably accurate acoustic velocity log. It is necessary only that the period of the seismic disturbance waveform be greater than the possible limits applicable to the chosen detector spacing for there to be no ambiguity of result.

FIGURE 2 of the drawings illustrates diagrammatically one form of basic apparatus which may be used for receiving and processing signals from the detectors, such as the subsurface detectors 2 of FIGURE 1. The function of this apparatus is effectively to measure the amount of time by which the first detector signal must be delayed with respect to the second detector signal in order to achieve maximum cross-correlation of the two signals. This delay time is then equal to the seismic travel time between the two detectors, assuming that the seismic disturbances generated at or near to the top of the bore-hole form the major source of the detector signals.

In the arrangement shown in FIGURE 2, the signals from the detectors 2 are fed separately into two signal amplifiers 11 and 12. In these they are amplified to a level which is suitable for acceptance by a signal storage unit 13, which may conveniently be a magnetic tape recorder. Recordings of the two signals, of several seconds' duration, are made simultaneously, using two separate tracks on a single tape (13a in FIGURE 6). A third track may be used to record a timing signal, or alternatively tape speed may be closely controlled so that this signal is unnecessary.

The signals from the storage unit 13 are then cross-correlated by means of a correlator 14, which correlator may be associated with or form part of the storage unit 13. It may for example be provided by or associated with play-back heads (13b and 13c in FIGURE 6) which are used to play-back the magnetically recorded signals.

Figure 6:
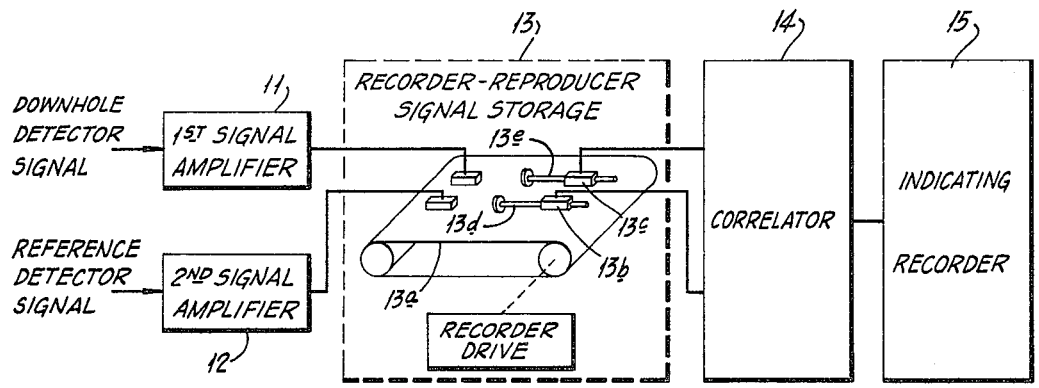
FIGURE 6 shows diagrammatically, one form of apparatus which may be used for receiving and processing signals received from the detectors of the system shown in FIGURE 5.

A time delay may be introduced into one signal relative to the other by moving the playback heads relative to one another along the axis of the tape movement (for example, by adjusting means indicated schematically at 13d and 13e in FIGURE 6). By adjustment of the time delay in discrete steps and by cross-correlating the two signals at each step, a graph of cross-correlation function against delay time may be plotted. The construction of such a graph is the function of the indicating recorder which is shown at 15 in FIGURE 2.

The cross-correlation may be effected in any of a number of ways. For example, the two signals may be multiplied together using a Hall-effect multiplier, the output of which latter is then integrated over discrete periods of time, being electrically integrated by means of a suitable integrating network. The results of such integration are then plotted by the recorder 15 on a chart (not shown) which is moved forward in a step-by-step manner in timed agreement with the steps of the cross-correlation. The position of a peak in the resulting graph will then indicate the time required by the seismic disturbance to travel through the distance $d$ between the detectors 2.

According to another method of correlating the signals from the two detectors, one signal may be used to form an elongated conducting head for a correlator of the kind which is described in British application No. 16,687/61 and in United States application Serial No. 190,912. Using such apparatus the time delay would be determined by a combination of auto-correlation and cross-correlation.

To do this the two signals from the detectors 2 are recorded together, preferably on a magnetic tape or other magnetic recording medium. From the recording of one signal an elongated playback head is produced having a conducting trace which corresponds to the wave-form of the signal. This head may, for example, be produced by one of the methods described in the aforesaid British and United States applications, particularly in British application No. 16,687/61.

Auto-correlation is effected by passing over such a head the recording of the signal which had been used to make the head. As a result of this a time indication can be obtained representing the instant at which the recorded signal passing over the head corresponded to the waveform of the head itself.

Cross-correlation between the two signals is next effected by passing the recording of the other signal over the same or a similar head. By comparing the results of the auto-correlation and the cross-correlation the time delay between the two signals can be ascertained.

If desired, the auto-correlation and cross-correlation can be effected simultaneously by using two playback heads, each having a conducting trace derived from the same signal. The recording medium carrying the recordings of the two signals is passed over the two heads simultaneously so that auto-correlation is effected by one head and cross-correlation by the other head. The time interval between the peak outputs of the auto-correlator and cross-correlator heads gives the time taken by the seismic disturbance to travel the distance $d$ between the detectors 2. The times will be the same if correlation is effected with the recording medium travelling at the same speed as was used for recording, but if correlation is effected at a different speed (which is quite possible) a suitable allowance is made in calculating the travel time.

An attractive feature of the apparatus which is illustrated in FIGURE 2 of the accompanying drawings is that filters (not shown) may be introduced into the signal circuits at the input to the correlator to modify the frequency response of the system. In this way the output of the cross-correlator is confined to the pass band of the filters and higher resolution may be obtained by the use of a suitable high pass filter. Selective filtering may also serve to remove troublesome components of signal which are repetitive within the period of expected cross-correlation. Phase distortion due to the addition of filters is unimportant since both signals are similarly affected.

Figure 3:
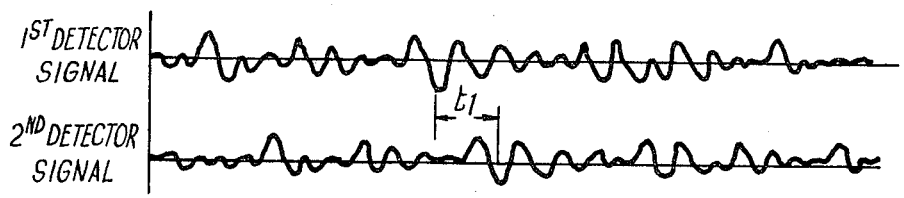
FIGURE 3 shows, by way of illustration only, the curves of two signals which might be received by the detectors of FIGURE 1 and fed to the apparatus shown in FIGURE 2.

In the accompanying drawings, FIGURE 3 shows, by way of example, two detector signals which may be fed to the signal storage unit 13 and used to operate a correlator 14.

Figure 4:
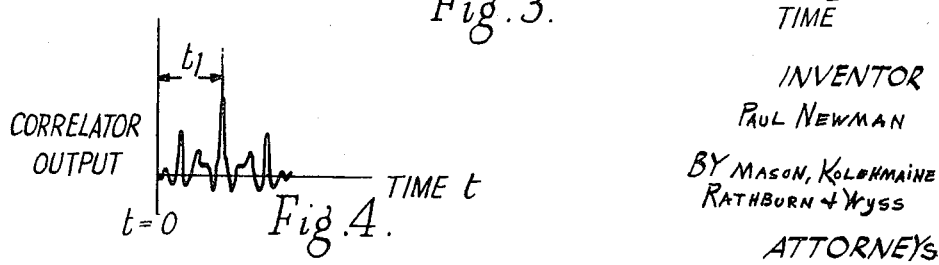
FIGURE 4 shows an output which might be received from a correlator forming part of the apparatus shown in FIGURE 2, derived from the reception of the signals shown in FIGURE 3.

After correlation of the two signals shown in FIGURE 3 a correlator output, which may be similar to that shown in FIGURE 4, is produced; the time difference due to the distance between the detectors 2 is that shown at $t_1$ in FIGURE 4. From this the velocity of propagation through the distance $d$ between the detectors 2 of FIGURE 1 can readily be calculated. Thus, the signals which are received at the first detector at a time $t=0$ are received by the second detector after a delay of $t_1$ seconds. The velocity of propagation through the distance $d$ between the detectors will then be $d/t_1$.

It may be noted here that FIGURE 4 represents an actual output which was obtained from a correlator using disturbances generated by three single-cylinder internal combustion engines running at speeds at 2700, 3000 and 3300 r.p.m., respectively.

In the application of the invention which has been particularly described use is made of two detectors both of which are located down the bore-hole below the surface of the earth and it is only the travel time for the distance $d$ between these detectors which is measured. The invention, however, also provides an important modification of this method and this is illustrated in FIGURES 5 and 6 and will now be described.

Figure 5:
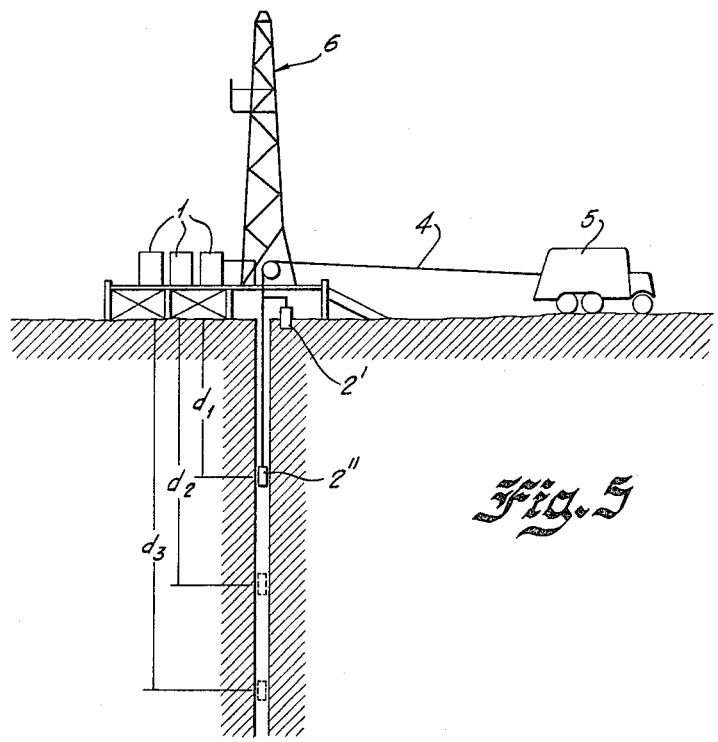
FIGURE 5 is a digrammatic view illustrating another arrangement for measuring seismic velocity in a bore-hole and using only a single downhole detector.

In such an alternative method of carrying out the invention one detector (or group of detectors), which will be termed the reference detector, is placed at a fixed distance from and in an ideal case vertically beneath the source of the seismic disturbance as indicated by the reference number 2' in FIGURE 5.

In one practical case the reference detector may be placed at the bottom of the "rat hole," by which term there is meant a shallow hole which is commonly drilled at the drilling platform for the purpose of accommodating the Kelly bar when this is not in use. Any other suitable hole may, however, conveniently be employed for the reference detector.

In another arrangement the reference detector or a pattern of reference detectors may be placed at the earth's surface close to and preferably around the source of the disturbance, or the reference detector or detectors may be attached to one or more parts of the equipment which forms the source of the disturbance.

Alternatively the reference detector may be located within the bore-hole, preferably but not necessarily at the upper end of the latter.

Whatever its precise location may be the reference detector or pattern of reference detectors is employed to sample the continuous seismic disturbance which is generated by drill head equipment and which is being transmitted into the earth's crust.

In conjunction with the reference detector a second detector 2" is used. This is suspended in the bore-hole by means of a suitable cable and it is lowered into the bore-hole in a series of discrete steps, each of a known amount. At each position of the second detector the signals from the two detectors are correlated using one of the methods which have already been described, particularly with reference to FIGURE 2 of the accompanying drawings and the corresponding arrangement. In this way a series of results will be obtained giving the travel times and hence the velocity of propagation of the disturbances over a series of distances, $d_1$, $d_2$, $d_3$, etc., between the reference detector and the second detector for the different positions of the latter. From these results the travel time and hence the velocity between two selected positions of the second detector can readily be calculated.

Since the seismic disturbance is of a continuous and repetitive nature it is apparent that many cross-correlation function maxima may occur as the separation and hence the seismic travel time between the two detectors is increased. However, if the second or bore-hole detector is lowered in successive incremental stages such that the travel time over each incremental stage is less than the repetitive period of the seismic disturbance any ambiguity of the result may be resolved.

In other words, in this application of the invention it is necessary only that the repetitive period of the seismic disturbance wave-form should be greater than the possible limits applicable to the incremental depth changes of the bore-hole detector.

An important advantage of the second application of the invention, as described above, is that the reference detector signals will have a reasonably constant and very high signal-to-noise ratio and only the bore-hole detector will contribute significantly to the noise content of the correlator output. In the first described method both the subsurface detectors contribute to the noise content and the signal-to-noise ratio of both detectors will deteriorate with increased depths beneath the seismic signal source.

A further advantage of the second method is that a new and separate travel time measurement is made after each successive incremental depth change of the bore-hole detector and that by this method there can be no cumulative error such as may result from the addition of measurements made over successive depth intervals.

It should be understood that the process of recording both detector signals is not essential to the methods of the present invention. In the methods which have been illustrated and described this has been done to facilitate subsequent review of on-site correlations and interpretations.

It would, however, be possible to correlate the two signals from the detectors 2 at the time of receipt, an adjustable time delay being introduced into one signal. The signals would in this case be multiplied and then integrated over discrete periods of time, different time delays being provided for one signal for the different measurements so that successive measurements are obtained each representing a different time delay. The maximum correlation output indicates that the time delay corresponds to the time taken by the disturbance to travel the distance $d$.

With this last method each correlation is effected on the basis of a different time portion of the disturbances generated by the motors 1, but this does not generally constitute a disadvantage and it may, in fact, be advantageous under some conditions.

Other propagation characteristics of seismic disturbances which may be investigated and determined quantitatively or qualitatively using the basic methods and apparatus of the invention are transmission losses and earth filtering effects. For such applications of the invention the sensitivities of the detectors and amplifiers are first equalised, while it is necessary that the source of the seismic disturbance at the top of the bore-hole should be the major contributor to the detector signals. The degree to which this is so will determine the accuracy of results.

Signals from both detectors are then subjected to spectral analysis to determine their frequency components and amplitudes. Such spectral analysis may be done by any of the methods which are well known and the required information can then be obtained by a comparison of the spectral contents of the respective signals.

I claim:

1. A method of determining a propagation characteristic for seismic disturbances of a medium formed by or in part of the earth's crust in which a bore-hole has been drilled, which method comprises positioning at least one reference detector adjacent the top of said bore-hole, lowering a second detector into said bore-hole, generating a prolonged repetitive seismic disturbance in the medium solely by means of rig equipment which includes at least one engine and which is located adjacent the top of the bore-hole and making measurements of the travel times of the seismic disturbance between the detectors for each of a number of positions of the second detector in the bore-hole, the repetition period of the disturbance being greater than the travel time for the disturbance between two adjacent positions of the second detector, and correlating the signals from the two detectors for the different positions of the second detector while introducing a time displacement between these signals and adjusting this time displacement to obtain a correlation output from which the time of travel of the disturbance between the different positions of said second detector can be ascertained.

2. A method according to claim 1, wherein the said detectors are located vertically one above the other and substantially vertically beneath the source of the disturbance.

3. A method according to claim 1, wherein the signals from the detectors are recorded on a recording medium and are then played back from said medium using two play-back devices and wherein the adjustment of said time displacement is effected by moving one at least of said play-back devices relatively to the other.

4. A method according to claim 3, wherein the signals from the detectors are recorded on a magnetic recording medium.

5. A method according to claim 1, wherein said time displacement is adjusted in discrete steps and wherein the signals are cross-correlated at each step, the result of such cross-correlation being plotted against time.

6. A system for determining a propagation characteristic for seismic disturbances of a medium formed by or in part of the earth's crust in which a bore-hole has been drilled, said system comprising a reference detector positioned adjacent the top of said bore-hole, a second detector, means for lowering said detector down said bore-hole and for supporting it therein at a plurality of positions which are spaced from each by known distances, means consisting of drill-head equipment having at least one engine for generating a prolonged repetitive seismic disturbance adjacent the top of said bore-hole, the repetition period of said disturbance being greater than the maximum travel time of the disturbance between two adjacent positions of said second detector in said bore-hole, and means for cross-correlating the resulting signals from said detectors with different time displacements therebetween to determine the travel time of the disturbance between the different positions of said second detector in said bore-hole.

7. A system according to claim 6, which includes recording means for storing the signals from both said detectors.

8. A system according to claim 6, wherein means are provided for recording the results of the cross-correlation for different time displacements.

9. A method of determining a propagation characteristic for seismic disturbances in part of the earth's crust in which a bore-hole has been drilled, which method comprises positioning at least one reference detector adjacent the top of said bore-hole, lowering a second detector into said bore-hole, generating a prolonged repetitive seismic disturbance in the earth's crust solely by means of rig equipment which includes at least one engine and which is located adjacent the top of the bore-hole, receiving the seismic disturbance at both of the detectors for each of a number of positions of the second detector in the bore-hole, the repetition period of the disturbance being greater than the travel time for the disturbance between two adjacent positions of the second detector, correlating the received signals from the two detectors for each position of the second detector, and obtaining from the correlations an output from which the time of travel of the disturbance between the different positions of the second detector can be ascertained.

10. A method of determining a propagation characteristic for seismic disturbances in part of the earth's crust in which a bore-hole has been drilled, which method comprises positioning at least one reference detector adjacent the top of said bore-hole, lowering a second detector into said bore-hole, repeatedly generating prolonged, repetitive seismic disturbances in the earth's crust solely by means of rig equipment which includes at least one engine and which is located adjacent the top of the bore-hole, receiving each of the seismic disturbances at both of the detectors with the second detector at a first position in the bore-hole to obtain a first pair of signals, moving the second detector to a second position within the bore-hole to obtain a second pair of signals, the repetition period of each disturbance being greater than the travel time for the disturbance between said first and second positions of the second detector, correlating the first pair of signals, correlating the second pair of signals and obtaining from the correlations an output from which the time of travel of the disturbance between the first and second positions of the second detector can be ascertained.

References Cited by the Examiner

UNITED STATES PATENTS

| | | | |
|---|---|---|---|
| 2,137,985 | 12/1938 | Salvatori | 181—5 |
| 2,688,124 | 8/1954 | Doty et al. | 340—15.5 |
| 2,874,795 | 2/1959 | Doty et al. | 181—5 |
| 2,989,726 | 6/1961 | Crawford et al. | 340—15.5 |
| 3,174,142 | 3/1965 | Mallinckrodt | 340—15.5 X |
| 3,199,106 | 8/1965 | Karr | 340—15.5 |

BENJAMIN A. BORCHELT, *Primary Examiner.*

R. M. SKOLNIK, *Assistant Examiner.*